Patented Dec. 1, 1953

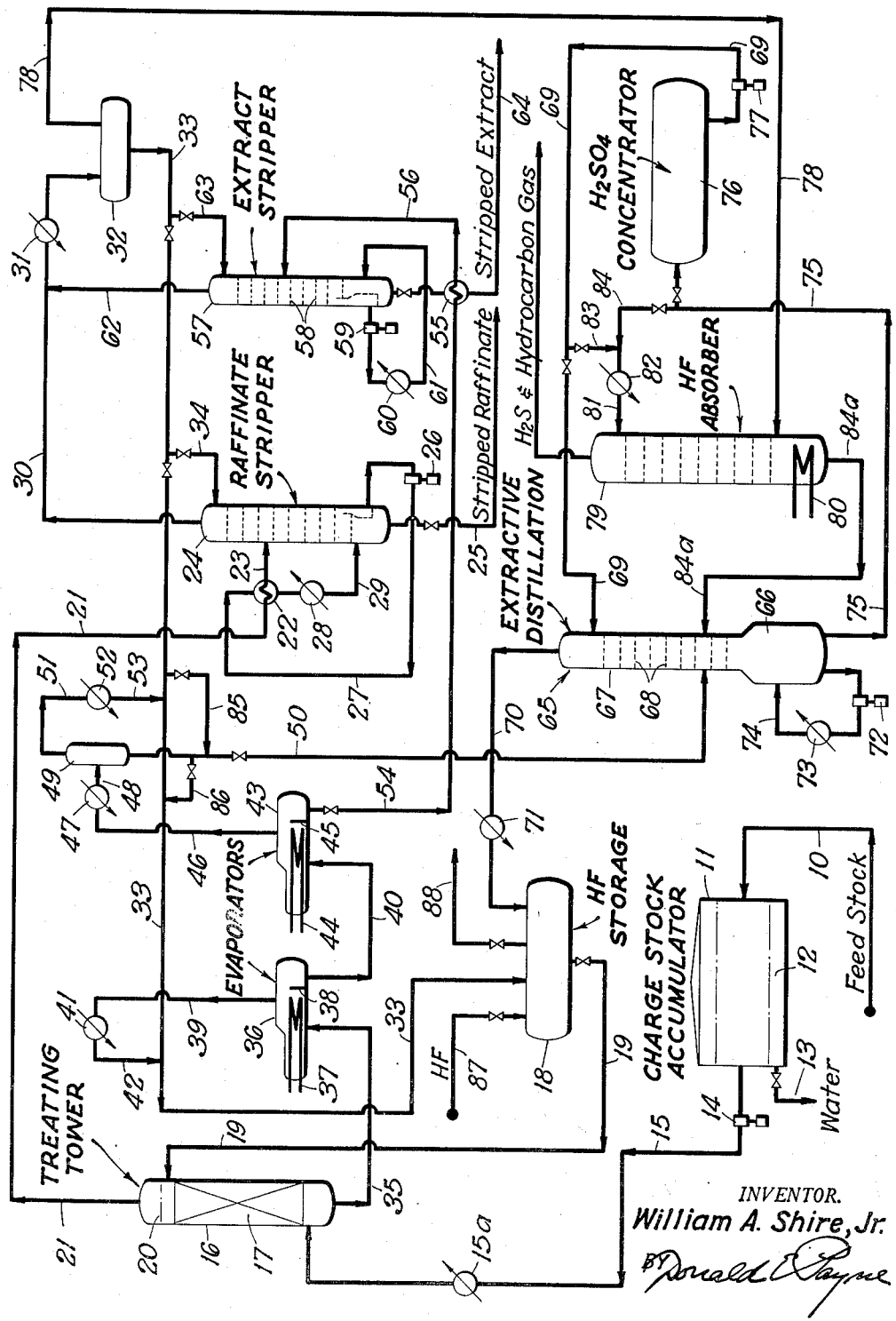

2,661,319

UNITED STATES PATENT OFFICE 2,661,319

HYDROGEN FLUORIDE PURIFICATION

William A. Shire, Jr., Munster, Ind., assignor to Standard Oil Company, Chicago, Ill., a corporation of Indiana Application March 21, 1950, Serial No. 150,856

5 Claims. (Cl. 196—31)

This invention relates to purification of hydrogen fluoride in order to obtain substantially pure hydrogen fluoride from hydrogen fluoride streams containing impurities such as water, hydrogen sulfide, etc. More particularly the invention pertains to the integration of such hydrogen fluoride purification with a commercial process and apparatus for refining high boiling hydrocarbon oils with liquid hydrogen fluoride.

It is known that many charging stocks for catalytic cracking processes contain large amounts of sulfur and also contain polycyclic aromatic hydrocarbons and other components which are undesirable in such charging stocks because said components have a deleterious affect on catalyst activity and/or they produce unduly large amounts of coke during the cracking step, thereby decreasing the potential capacity of a commercial catalytic cracking unit, increasing operating costs, and decreasing yields of valuable products. It is desirable to remove these objectionable components from such charging stocks by treating and/or extracting them with substantially anhydrous liquid hydrogen fluoride, but such extraction has presented many problems. One of the most vexations of these problems is that of preventing build-up of impurities in the hydrogen fluoride recovered from the raffinate and extract and recycled in the system. Certain of the recovered hydrogen fluoride streams are contaminated with excessive amounts of water which cannot be removed from the hydrogen fluoride by simple distillation because of the constant boiling mixture which is formed. Other gasiform streams contain large amounts of hydrogen sulfide and other extraneous gases from which must be separated hydrogen fluoride contained therein. Any processes heretofore considered for purification of such streams have been unduly cumbersome, costly and inefficient particularly since they either fail to effect recovery of hydrogen fluoride in the desired purity or they resulted in excessive hydrogen fluoride losses. An object of the invention is to provide a method and means for affecting removal of objectionable components such as water, hydrogen sulfide, etc. from hydrogen fluoride streams which will result in production of substantially anhydrous hydrogen fluoride, which will result in negligible hydrogen fluoride losses and which will be simpler and less expensive than processes heretofore employed.

A further object is to provide an improved method and means for producing substantially anhydrous hydrogen fluoride from aqueous hydrogen fluoride. Another object is to provide an improved method and means for recovering substantially all hydrogen fluoride from a gasiform stream so that other components of said stream, such as hydrogen sulfide, hydrocarbons, etc., may be vented without suffering hydrogen fluoride losses. The objective of maintaining hydrogen fluoride losses at a minimum is essential not only from the standpoint of material costs, but it is extremely important from the standpoint of the safety and health of the operators because hydrogen fluoride is known to be extremely toxic.

A further object of the invention is to provide an integrated system for recovering substantially anhydrous hydrogen fluoride from a plurality of streams, at least one of which contains inert gases and hydrogen sulfide as major impurities while another contains water as a major impurity. Another object is to integrate such a purification system with a commercial unit for extracting high boiling hydrocarbon charging stocks such as reduced crude oil and virgin, thermally cracked or catalytically cracked fractions thereof such as gas oils, furnace oils, heater oils or the like.

In accordance with my invention, I employ a combined extraction and distillation by introducing aqueous hydrogen fluoride at a low point in a column, introducing concentrated sulfuric acid at an upper point in said column, heating the base of the column to a temperature sufficient to eliminate substantially all of the HF from diluted sulfuric acid and cooling the top of the column to obtain extraction efficiency while permitting removal of substantially anhydrous HF vapors. Beneficial results may be obtained by introducing sulfuric acid as dilute as 80% above the aqueous HF inlet and withdrawing 50% $H_2SO_4$ from the base of the column, with a column top temperature of 70° F. and a bottom temperature of 260° F. Best results, however, are obtained by introducing a more concentrated sulfuric acid, i. e., introducing a sulfuric acid of greater than 90% concentration; the introduced acid should be as concentrated as economically feasible, but for commercial operation 93% acid is satisfactory. The amount of sulfuric acid introduced will depend on the amount of water which is introduced with the aqueous HF stream and, for practical purposes, the amount should be sufficient to give an exit acid concentration of at least about 70% and preferably about 80 to 85%. For these preferred exit acid concentrations, the column bottom temperature should be in the range of 300 to 350° F., preferably about 325° F., in order to avoid contamination of the dilute sulfuric acid with HF. The upper part of the column may be at a temperature as low as 70° F. if atmospheric pressure is employed, but I prefer to employ a pressure of about 5 to 10° F., in which case the top temperature should be at least about 80 to 90 p. s. i. g. and preferably in the range of about 80 to 120° F.

It is essential that the diluted sulfuric acid withdrawn from the base of the column contain very little, if any, hydrogen fluoride in order that this sulfuric acid may be concentrated in any conventional manner and returned to the upper part of the extractive distillation column.

It is known that sulfuric acid can be employed for scrubbing hydrofluoric acid from gaseous hydrocarbon contaminants. I have found that $H_2S$ can likewise be separated from HF by such procedure even when the sulfuric acid absorbent contains as much as 5 to 20% of water, 93% sulfuric acid being well suited for this purpose. Aqueous HF—$H_2SO_4$—$H_2O$ liquid removed from the base of the absorption tower may be extractively distilled with concentrated sulfuric acid in the manner hereinabove described for recovering substantially anhydrous HF. At least a part of the dilute sulfuric acid from the base of the extractive distillation column may be cooled and employed as absorber liquid in the absorption tower.

In a system for treating sulfur-containing hydrocarbons with hydrogen fluoride and recovering impure hydrogen fluoride streams from treated products, at least one of such streams usually contains considerable quantities of water and at least one other of said streams contains gaseous impurities such as $H_2S$ and light hydrocarbons. In such a system the aqueous hydrogen fluoride is extractively distilled with concentrated sulfuric acid in one vessel and the $H_2S$ contaminated stream is contacted with a water-containing sulfuric acid in an absorber tower, the gaseous impurities from the absorber tower being vented from the system and the rich liquid therefrom being introduced into the extractive distillation vessel. A high pressure as well as low temperature increases the effectiveness of the absorption and the absorption tower may operate at about 10 to 30 p. s. i. g. A part of the diluted sulfuric acid from the fractional distillation vessel may be employed as absorber liquid in the absorption tower. At least a part of the dilute sulfuric acid from the extractive distillation step is reconcentrated in any known manner and re-employed in the system.

The invention will be more clearly understood from the following detailed description read in conjunction with the accompanying drawing which forms a part of this specification and which is a simplified flow diagram of a commercial plant for practicing the invention.

While the invention in its broader aspects may be applied to the purification of hydrogen fluoride generally, i. e. regardless of the source and nature of the contaminants (provided that they are removable from the hydrogen fluoride by the described methods of contacting with sulfuric acid), it is particularly applicable to hydrocarbon conversion processes employing hydrogen fluoride as a catalyst and/or solvent and it will be described as employed in a commercial plant for refining with hydrogen fluoride, about 40,000 barrels per stream day of a mixture of high sulfur virgin gas oil, coke still gas oil, and cracked gas oil, said mixture having an A. P. I. gravity of about 26.1° and a sulfur content of about 1.9 weight per cent, said mixture usually containing water in amounts which may be as high as 0.1% by weight. Such charging stock is preferably introduced by line 10 to an accumulator tank 11 wherein it is allowed to remain in a quiescent condition for a time sufficient to effect the settling of dispersed or emulsified water and the formation of a lower aqueous layer 12 which is withdrawn from the system through valved line 13. This simple settling is usually adequate for removing most of the dispersed water from the charging stock but if desired the settling may be facilitated by addition of known demulsifying agents and/or the charging stock may be passed through a coalescer or any other known means for facilitating separation of water from oil. The mixed gas oil charging stock (which may still contain as much as .1% by weight of water) is introduced by pump 14 through line 15 and heat exchanger 15a to the base of treating tower 16. The treating or extraction temperature should be in the range of 50 to 150° F. and it is preferably at about 120° F. Intimacy of contact in countercurrent tower 16 may be increased by employing baffle plates of known construction or packing material 17 such, for example, as carbon steel Rachig rings, Berl saddles, shaped Monel screen fragments or expanded metal lath, such packing material being, of course, fabricated from HF resistant material. Intimacy of contact may also be attained by intimately dispersing charging stock into the acid phase by known distributors designed for that purpose.

Liquid substantially anhydrous hydrogen fluoride from accumulator or storage tank 18 is introduced through valved line 19 into tower 16 at a point near the top thereof and immediately above the packed zone 17. The counterflow of gas oil and hydrogen fluoride in tower 16 results in both extraction and chemical reaction. The interface 20 between acid and oil phases is preferably maintained at a high point in the column and is illustrated as being above the point of HF inlet so that the heavier acid phase is continuous throughout the countercurrent contacting section of the tower. It should be understood, however, that other known contacting means may be employed instead of or in addition to the illustrated countercurrent tower.

In this particular plant for charging 40,000 barrels per stream day, the oil charging rate is about 523,000 pounds per hour and in addition there may be about 500 pounds per hour of water. Hydrogen fluoride is introduced at the top of the tower at about 174,000 pounds per hour of which about 1,300 pounds (.75 weight per cent) is water, about 170 pounds is $H_2S$ and about 470 pounds is HF-soluble oil derived from previous contact of the hydrogen fluoride reagent stream with gas oil charging stock.

The contacting in tower 16 is at a pressure sufficient to maintain both the hydrocarbons and the hydrogen fluoride in liquid phase, usually in the range of about 30 to 100 p. s. i. g., for example about 70 p. s. i. g. The total holding or residence time of the oil in tower 16 should be in the range of about 5 to 50 minutes, for example about 15 minutes.

The raffinate-oil phase is withdrawn from the top of tower 16 through conduit 21, heat exchanger 22, and conduit 23 into raffinate stripper tower 24 at the rate of about 405,000 pounds per hour. Stripped raffinate containing not more than about .01 weight per cent of HF is withdrawn through line 25 at the rate of about 401,500 pounds per hour; this raffinate may then be charged to a catalytic cracking unit of the fixed bed, moving bed, or fluid type employing solid siliceous catalyst either natural or synthetic and preferably of the silica alumina or silica magnesia type. Heat for the stripping operation is obtained by withdrawing liquid in the lower part of the stripper through pump 26, heat exchanger 22, line 27 and heater 28 and reintroducing the heated liquid through line 29. The stripper is operated with a top temperature in the range of 190 to 250° F., e. g. 215° F., a bottom temperature in the range of 500 to 650° F., e. g. 550° F., and at pressures between about atmospheric and 50 p. s. i. g., for example a top pressure of 8 p. s. i. g. and a bottom pressure of 10 p. s. i. g.

Overhead from raffinate stripper 24 is withdrawn through conduit 30 to condenser 31 and thence to receiver 32 from which the condensate may be returned by line 33 to HF storage tank 18, a part of the condensate being introduced by line 34 for use as reflux in stripper 24. Although this HF condensate contains some water and H₂S, these impurities are present in such amounts as to be tolerable in the system.

The acid extract phase from the base of the treating tower is withdrawn through line 35 to primary evaporator 36, which is provided with a heating coil 37 and a weir 38. This evaporator which may be of stainless steel is operated at a temperature in the range of 150 to 250° F., e. g. 177° F. and a pressure in the range of 30 to 65 p. s. i. g., for example 53 p. s. i. g. with a liquid holding time of approximately 2 minutes. Under these conditions, about 35 to 40% of the free hydrogen fluoride is vaporized together with substantially all of the free (uncombined) H₂S and a portion of the water; the amounts of H₂S and water, however, are sufficiently small so that the vapors may be withdrawn through line 39, condenser 41 and lines 42 and 33 to HF storage tank 18.

Unvaporized liquid from primary evaporator 36 is withdrawn through line 40 to secondary evaporator 43 which is likewise of stainless steel and provided with heating coils 44 and weir 45. This second stage evaporator is operated at a temperature in the range of 200 to 300° F., e. g. 240° F., under a pressure in the range of about 10 to 50 p. s. i. g., for example 35 p. s. i. g., the liquid holding time of the order of about 3 minutes. Under these conditions about half of the originally contained hydrogen fluoride together with a substantial amount of the originally contained water, but practically no H₂S, is withdrawn in vapor form through conduit 46 to partial condenser 47 which provides sufficient cooling to condense about 10 to 25 weight per cent or preferably about 15 to 20 weight per cent of the HF in said vapor stream. The condensed and uncondensed vapors are then introduced by line 48 to separator 49 from which condensate is withdrawn by line 50 to my improved HF purification system. The stream thus withdrawn through line 50 consists of about 4,800 pounds per hour of HF and 530 pounds per hour of water; thus it will be seen that the total amount of water originally introduced and/or produced in the system is concentrated in a relatively small stream which greatly minimizes the HF purification problem and it will also be seen that this relatively small stream contains no H₂S which further simplifies the purification problem. The overhead from separator 49 passes through line 51, condenser 52, and lines 53 and 33 to HF storage vessel 18.

Liquid from the second stage evaporator 43 is withdrawn through line 54, heat exchanger 55 and line 56 to extract stripper 57, which, like the raffinate stripper, may be provided with suitable bubble trays or equivalent gas-liquid contacting means 58. Heat is supplied to the extract stripper by withdrawing liquid from the base thereof through pump 59 and heater 60, the heated liquid being returned through line 61. The extract stripper is operated at a top temperature in the range of about 90 to 250° F., e. g. about 215° F., a bottom temperature in the range of 575 and 700° F., e. g. 640° F., and under a pressure in the range of about atmospheric to 50 p. s. i. g., for example about 10 p. s. i. g. Overhead from the stripper is withdrawn through line 62 to line 30 and reflux for the stripper may be supplied from line 33 by line 63. Stripped extract is withdrawn through line 64.

No novelty per se is claimed in the system thus far described since such system is described and claimed in copending application Ser. No. 134,513, filed by Giachetto, Wagner and Wolf. In the system of said copending application, however, the removal of impurities such as H₂O and H₂S from hydrogen fluoride streams involved azeotropic distillation and neutralization of a considerable amount of the hydrogen fluoride and it was thus not only cumbersome and expensive, but it resulted in loss of substantial amounts of hydrogen fluoride. My invention provides a simpler, less expensive and more efficient method and means for removing impurities from hydrogen fluoride streams and my invention is integrated with the system heretofore described in the manner which will now be set forth.

The hydrogen fluoride-water stream which, in this case, contains about 10 weight per cent water is introduced by line 50 to extractive distillation vessel 65 which may be in the form of a pot 66 superimposed by a column 67 containing packing material or bubble trays 68. Concentrated sulfuric acid is introduced at the upper part of the column through line 69. This sulfuric acid should be as concentrated as economically feasible and should usually be about 90 to 100% concentration, 93% concentration being employed in this particular example. The amount of acid introduced will depend upon the concentration of the acid, about 3,000 pounds per hour of 90% acid being required in this particular example, while about 2,100 pounds per hour of 93% acid is sufficient. The extractive distillation vessel is preferably under a pressure of 5 to 10 p. s. i. g. in order that the substantially anhydrous HF which is removed in vapor form through line 70 may be condensed in condenser 71 at ordinary cooling water temperature and returned to HF storage tank 18. The top temperature of vessel 65 under these conditions should be in the range of about 90 to 120° F., e. g. about 100° F., and the bottom temperature should be in the range of about 300 to 350° F., e. g. about 325° F., said bottom temperature being maintained by withdrawing liquid by pump 72, passing it through heater 73 and returning it through line 74 to supply any heat required in addition to that obtained by the addition of water to the sulfuric acid which takes place in this vessel. Generally speaking, the amount of concentrated sulfuric acid added to the extractive distillation vessel should be sufficient to insure that the aqueous sulfuric acid withdrawn from the base of the vessel through line 75 have a concentration in the range of about 70 to 85%, e. g. about 80%. The dilute acid is introduced by line 75 to sulfuric acid concentrator 76 which may be of any known type wherein the acid may be concentrated by removing water or by addition of SO₃. Concentrated acid is returned by pump 77 and line 69 to the upper part of the extractive distillation vessel.

Under conditions employed, particularly in the extract stripper 57, considerable amounts of combined sulfur will be liberated as H₂S. Also, there is a formation and/or liberation of gaseous hydrocarbons. These gaseous hydrocarbons and H₂S are withdrawn from the top of accumulator 32 through line 78 as a gaseous stream which, on a weight basis, may contain about 90% HF, 2% H₂S and 8% hydrocarbon gas, the amount of H₂S in said stream amounting to approximately 275 pounds per hour. In order that the H₂S and hydrocarbons may be vented from the system without loss of hydrogen fluoride, the impure HF stream from line 78 is introduced at a low point in HF absorber tower 79, which is preferably operated at a higher pressure than extractive distillation vessel 65, e. g. in a range of about 10 to 30 p. s. i. g. or about 15 p. s. i. g. The temperature of the absorption tower is maintained as low as economically feasible, which is usually about 0 to 80° F., for example about 60 to 70° F. The absorption tower may be cooled in any known manner as exemplified by cooling coil 80 and the sulfuric acid which is introduced at the upper part of the tower through line 81 is preferably cooled in cooler 82. Here again, the amount of sulfuric acid introduced in the top of the absorption tower is dependent upon its concentration as well as on the amount of HF in the introduced gas stream. 100% H₂SO₄ at 80° F. will dissolve approximately 38 weight per cent, the solubility of HF increasing with decreased temperature and decreasing with increased temperature. Thus, if 93% sulfuric acid is introduced by line 83 through cooler 82 and line 81 to the absorption tower, approximately 100,000 pounds per hour will be required in this particular example. The rich absorber liquid may be withdrawn from the base of the absorption tower through line 84 and introduced into extractive distillation vessel 65 for recovering substantially anhydrous HF from the sulfuric acid adsorbent.

Alternatively, since substantially no water is introduced in the impure HF stream in line 78, I may cycle most of the diluted sulfuric acid from line 75 through line 84, cooler 82 and line 81 to the absorption tower so that the bulk of the sulfuric acid simply acts as an absorber liquid in tower 79 and is flashed or freed from HF in vessel 65, only a minor amount of sulfuric acid being introduced into concentrator 76 as required for supplying the concentrated acid introduced to the top of the extractive distillation vessel through line 69. Another alternative (not shown) is to provide a separate HF flash chamber (not shown) for removing HF from acid discharged through line 84a, said acid, after removal of HF, being simply cooled and returned to the top of the absorption tower and only such quantities of the acid being introduced into extractive distillation column 65 to avoid excessive build-up of water in the absorption acid.

In the system hereinabove described, it will be seen that the volume of HF streams requiring purification has been minimized by the use of multi-stage evaporators for removing solvent from extract, returning to HF storage those streams which contain tolerable amounts of impurities and thus charging to the HF purification system only those streams which contain amounts of impurities which, if not removed from the system, would cause a build-up of impurities in the system as a whole. If it is desired to operate with HF of higher purity, additional water-containing HF may be introduced from line 33 to line 50 by line 85. On the other hand, if more condensate is produced in cooler 47 than is essential, a part of such condensate can be returned by line 86 to line 33. Any small amount of make-up HF which is required is introduced into storage tank 18 by line 87. Since some of the streams which discharge into storage tank 18 contain small amounts of H₂S, gases are preferably discharged from the top of the HF storage tank 18 through line 88 to line 78.

Test data have shown that even batch still distillation of 621 parts by weight of 93% sulfuric acid admixed with 682 parts by weight of 85.3% hydrogen fluoride results in liberation of 98% HF with a temperature in the range of 300 to 350° F. The 80% sulfuric acid withdrawn from the pot can be concentrated back to 93% sulfuric acid in a conventional sulfuric acid concentrator employing, for example, hot flue gases at a temperature of 460° F. The fluorine contained in the reconcentrated acid thus obtained is less than 10 parts per million. While substantial purification can thus be obtained in ordinary batch distillation, enormously better results can be obtained by extractive distillation with concentrated sulfuric acid in the manner hereinabove described.

While my invention has been described as an integral part of a commercial system for treating hydrocarbon oils with hydrogen fluoride, it should be understood that the invention is not necessarily limited thereto but may be applied to other systems wherein hydrogen fluoride or hydrogen fluoride systems are contaminated components removable by, and/or in the presence of, sulfuric acid.

I claim:

1. The method of avoiding build-up of impurities in hydrogen fluoride employed in a system for treating hydrocarbons wherein a hydrocarbon stream containing dissolved water is contacted with hydrogen fluoride under conditions to give raffinate and extract phases, and hydrogen fluoride is removed from each phase to give a first liquid hydrogen fluoride stream containing a substantial amount of water, a second gasiform hydrogen fluoride stream containing gasiform impurities and a third substantially anhydrous hydrogen fluoride stream, which method comprises introducing said first hydrogen fluoride stream into an extractive distillation zone at a low intermediate level thereof, introducing concentrated sulfuric acid at the upper part of said zone, heating the lower part of said zone to a temperature in the range of about 300 to 350° F., withdrawing from the base of said extractive distillation zone diluted sulfuric acid which is free from hydrogen fluoride, reconcentrating at least a part of said diluted sulfuric acid and returning said reconcentrated sulfuric acid for introduction to the upper part of the extractive distillation zone, introducing the second hydrogen fluoride stream at a low point in an absorption zone, introducing sulfuric acid at the upper part of said absorption zone, maintaining said absorption zone at a temperature below 100° F., venting unabsorbed gases from the upper part of the absorption zone, and introducing enriched absorber liquid from the bottom of said absorption zone into said extractive distillation zone.

2. The method of claim 1 which includes the further step of introducing a substantial part of the diluted sulfuric acid from the base of the extractive distillation zone through a cooling zone and thence to the upper part of the absorption zone.

3. A refining process which comprises treating with hydrogen fluoride a hydrocarbon oil which contains sulfur compounds and which also contains a small amount of dissolved water, said treating being under conditions to form a raffinate phase consisting chiefly of hydrocarbons and an extract phase containing most of the hydrogen fluoride, sulfur and water, evaporating hydrogen fluoride from the extract phase in a plurality of stages, operating the first of said stages under conditions to remove substantially all of the free $H_2S$ which may be present but only a portion of the hydrogen fluoride and water, operating the second of said stages under conditions to remove most of the remaining hydrogen fluoride and water without liberating additional hydrogen sulfide, stripping liquid from the second of said stages under conditions to remove the remainder of the hydrogen fluoride and to liberate hydrogen sulfide, concentrating most of the water vaporized in the second of said stages in about 10 to 25% of the hydrogen fluoride separated in said stage and introducing said concentrate into an extractive distillation zone, introducing concentrated sulfuric acid into said extractive distillation zone and recovering substantially anhydrous hydrogen fluoride from the upper part of said extractive distillation zone, introducing a gasiform stream of hydrogen fluoride and $H_2S$ liberated in the extract stripping zone into an absorption zone, selectively absorbing hydrogen fluoride from hydrogen sulfide by means of a sulfuric acid absorber liquid, recovering substantially anhydrous hydrogen fluoride from sulfuric acid absorber liquid which is enriched with hydrogen fluoride in the absorption zone, and returning recovered hydrogen fluoride to the treating step.

4. The method of claim 1 which includes the steps of introducing hydrogen fluoride enriched sulfuric acid from the absorption zone into said extractive distillation zone, introducing at least a part of the dilute sulfuric acid from the extractive distillation zone back to said absorption zone, concentrating another part of the sulfuric acid withdrawn from the extractive distillation zone and returning at least a part of said concentrated acid for re-introduction into the extractive distillation zone.

5. The method of processing a liquid hydrogen fluoride stream containing water which cannot be removed therefrom by simple distillation which method comprises introducing said liquid aqueous hydrogen fluoride stream at an intermediate level in an extractive distillation zone, introducing sulfuric acid of about 90 to 100 weight per cent concentration at the upper part of said zone in an amount sufficient to combine with the water contained in the introduced stream without diluting the sulfuric acid below about 80 weight per cent, maintaining said zone at a pressure of about 5 to 10 pounds per square inch gauge, maintaining the top of said zone at a temperature in the range of about 80° to 120° F., heating the bottom of said zone to maintain it at a temperature in the range of about 300° to 350° F., withdrawing from the top of said zone as anhydrous HF substantially all of the HF introduced into said zone, and withdrawing from the base of said zone sulfuric acid of at least about 80 weight per cent concentration and free from HF whereby said withdrawn sulfuric acid may be concentrated by removal of water to obtain the concentrated acid for return to the upper part of said zone.

WILLIAM A. SHIRE, Jr.

References Cited in the file of this patent

UNITED STATES PATENTS

| Number | Name | Date |
|---|---|---|
| 1,764,593 | Adamson | June 17, 1930 |
| 2,357,095 | Evans | Aug. 29, 1944 |
| 2,449,463 | Evering et al. | Sept. 14, 1948 |
| 2,507,605 | Lopker et al. | May 16, 1950 |
| 2,532,492 | Giachetto | Dec. 5, 1950 |

FOREIGN PATENTS

| Number | Country | Date |
|---|---|---|
| 289,383 | Great Britain | July 4, 1929 |
| 357,438 | Great Britain | Sept. 24, 1931 |
| 387,614 | Great Britain | Feb. 9, 1933 |